United States Patent [19]

Waters

[11] Patent Number: 4,790,501
[45] Date of Patent: Dec. 13, 1988

[54] WALL MOUNTING DEVICE

[76] Inventor: Joseph T. Waters, 1630 S. 82nd St., West Allis, Wis. 53214

[21] Appl. No.: 76,879

[22] Filed: Jul. 23, 1987

[51] Int. Cl.[4] ............................................. G12B 9/00
[52] U.S. Cl. .................................................. 248/27.1
[58] Field of Search ...................... 248/27.1, 27.3, 56, 248/DIG. 6, 300; 220/3.2, 3.9; 174/60, 66, 65 R

[56] References Cited

U.S. PATENT DOCUMENTS

| | | |
|---|---|---|
| 945,753 | 1/1910 | Chamberlain et al. . |
| 1,113,092 | 10/1914 | Beugler . |
| 1,490,252 | 4/1924 | Bissell . |
| 1,734,322 | 11/1929 | Appleton . |
| 1,791,311 | 2/1931 | Hamblen . |
| 1,963,951 | 6/1934 | Bowers . |
| 2,456,450 | 12/1948 | Sauter . |
| 2,457,119 | 12/1948 | Bour . |
| 2,492,115 | 12/1949 | Crowther ............................ 174/66 |
| 2,772,062 | 11/1956 | Bowser . |
| 3,197,549 | 7/1965 | Good . |
| 3,380,612 | 4/1968 | Mossburg et al. . |
| 3,619,476 | 11/1971 | Rasmussen . |
| 3,745,664 | 7/1973 | Altseimer . |
| 4,255,637 | 3/1981 | Matsuda ............................ 174/66 X |
| 4,274,330 | 6/1981 | Witten et al. ................... 248/27.1 X |
| 4,447,030 | 5/1984 | Nattel ................................. 248/27.1 |
| 4,561,615 | 12/1985 | Medlin, Jr. ......................... 248/27.1 |
| 4,576,349 | 3/1986 | Dearing .............................. 248/27.1 |
| 4,576,431 | 3/1986 | Thayer ................................ 339/131 |
| 4,638,936 | 1/1983 | Hernandez .................... 248/27.1 X |
| 4,685,035 | 8/1987 | Nanjoh ........................ 248/27.1 X |

Primary Examiner—Ramon O. Ramirez
Attorney, Agent, or Firm—Andrus, Sceales, Starke & Sawall

[57] ABSTRACT

A device for framing an opening in a panel, such as a wall, includes frame means having an edge portion to abut a first surface of the panel. The frame is provided with a plurality of posts extending from the rear side of the edge portion. The posts are adapted to be inserted through an opening provided in a panel. One or more retainer plates are provided with a flat surface for abutting the inner surface of the panel, and include passages adapted to receive and provide a frictional connection to the posts extending from the frame means. A fastener may extend between the frame and the retainer plates, to provide a secure attachment of the frame to the panel.

18 Claims, 2 Drawing Sheets

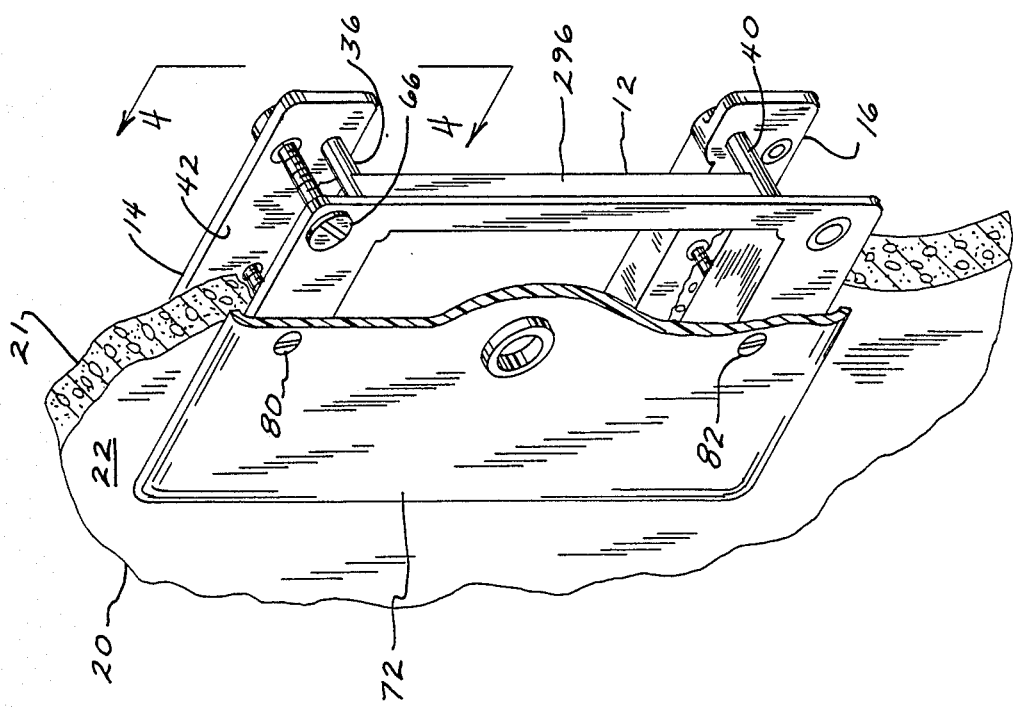

WALL MOUNTING DEVICE

BACKGROUND AND SUMMARY

The present invention relates to a device for finishing or framing an opening in a wall or other panel, and more particularly to such a device which provides a means for mounting an electrical fixture, such as wall plate or a wall-mount telephone, to a wall.

In electrical wiring, it is known to use a conventional box having four sides, a back, and an open front. Such a box is commonly used in higher voltage wiring applications, and its use is generally mandated by local building codes or ordinances. This conventional box is typically mounted to a structural member, such as a two-by-four stud, within a wall.

In lower voltage wiring applications, such as for telephone or television installations, it is usually not necessary to use such a heavy duty conventional outlet box. To install such low voltage wiring, an opening is formed in the wall or other panel to provide passage of the wiring therethrough, to allow the wiring to reach the intended room or equipment. After forming such an opening in the wall, it is generally desirable to install a device over the opening for mounting a wall plate or other fixture onto the wall. Such a fixture serves to conceal and finish the unsightly opening and provide an aesthetically pleasing passage of the wiring through the wall.

It is an object of the present invention to provide a device for mounting on a wall or panel at an opening provided therein which provides a passage for wiring, for framing and finishing the opening in the panel.

Another object of the invention is to provide such a device which can be easily mounted on the wall or panel, regardless of its thickness.

Another object of the invention is to provide such a device which provides a firm and secure mounting to the panel, and which is capable of withstanding a significant amount of pullout force.

Yet another object of the invention is to provide such a device which is capable of providing a clamping effect on the portion of the wall or panel surrounding the opening therein, to secure the device to the wall or panel.

In accordance with the invention, a device for finishing an opening in a panel having spaced first and second surfaces is provided with a frame for mounting adjacent the first surface of the panel and having an opening therein adapted to communicate with the panel opening. The frame has a first engagement means formed integrally therewith. One or more retainer means, distinct from the frame, is adapted for mounting adjacent the second surface of the panel for mounting the frame to the panel. The retainer means is provided with second engagement means for cooperating with the first engagement means provided on the frame, to secure the frame to the panel. In one embodiment, the first engagement means comprises a plurality of posts extending from the frame through the panel. The retainer means includes one or more cooperating receiving means disposed in the retainer means for receiving and engaging the posts for mounting the frame means to the panel. The receiving means may comprise passages disposed in the retainer means for mating with, and providing a frictional connection to, the posts.

BRIEF DESCRIPTION OF THE DRAWINGS

The drawings illustrate the best mode presently contemplated of carrying out the invention.

In the drawings:

FIG. 3 is a perspective view of the present invention as installed on a wall or panel at an opening provided therein.

FIG. 4 is a side elevation view of a portion of the present invention taken generally along line 4—4 of FIG. 3.

DETAILED DESCRIPTION

Figure 1:
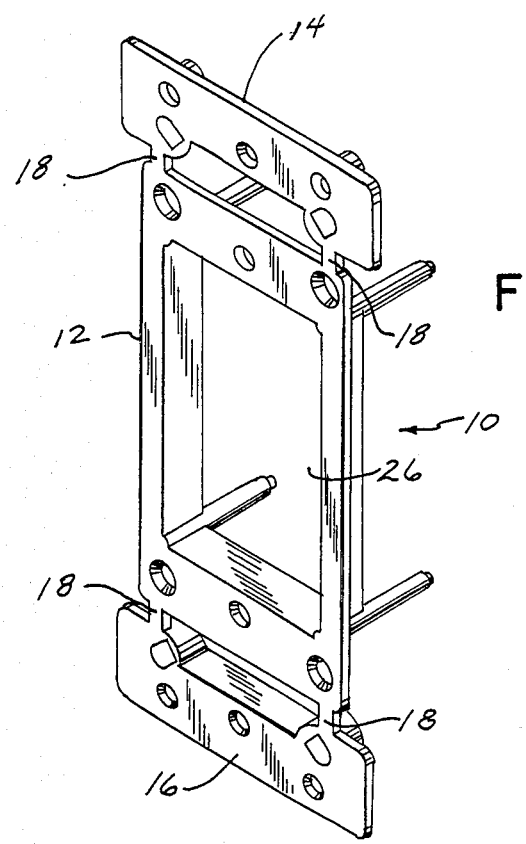
FIG. 1 is a perspective view of the wall mount device of the present invention in its manufactured form, showing the retainer means removably connected to the frame.
Figure 2:
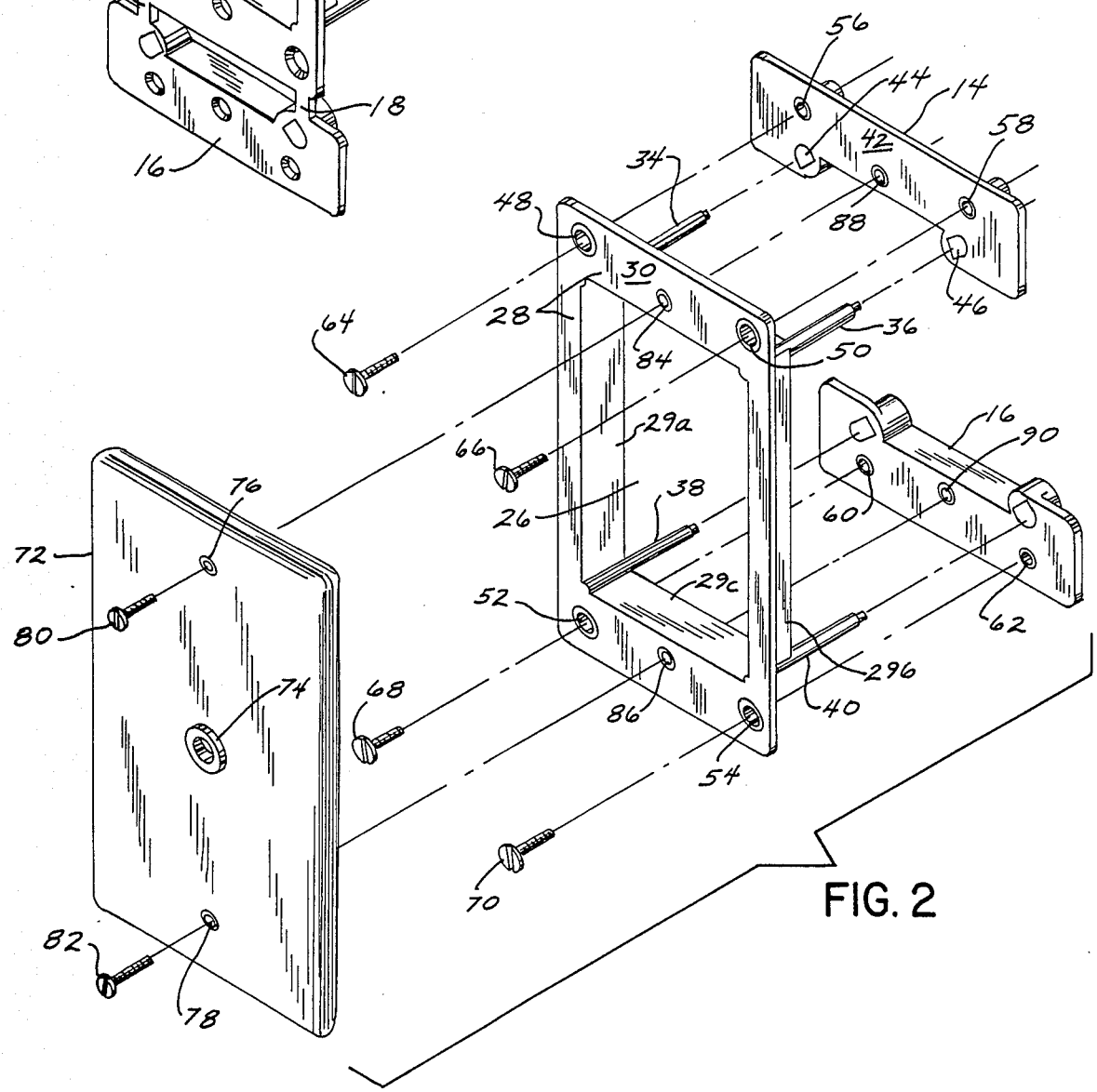
FIG. 2 is an exploded perspective view of the wall mount of the present invention, including a wall plate.

As shown in FIG. 1, a device 10 for finishing or framing an opening in a panel includes a frame 12 and a pair of retainer plates, namely top retainer plate 14 and bottom retainer plate 16. Device 10 is preferably injection molded using a suitable thermoplastic material, and as shown in FIG. 1 the various components of device 10 may be formed integrally. Connector portions 18 span between frame 12 and top and bottom retainer plates 14 and 16, respectively. When so formed, finishing device 10 may be sold as a one-piece unit. When preparing to install finishing device 10, retainer plates 14 and 16 are removed from the assembly by forcibly breaking the connection to frame 12 provided by connector portions 18.

As shown in FIG. 3, framing device 10 is adapted to be mounted on a panel 20 having an opening formed therein. Panel 20 includes an inner surface 21 and an outer surface 22. Panel 20 may be composed of any material; in a typical application, panel 20 is a wall component formed of gypsum board or the like. The panel opening is formed to allow an electrical lead or connector (not shown) to pass from the interior of a wall through the wall material, such as panel 20, and to the exterior of the wall.

Frame 12 is adapted to finish the opening in panel 20. Frame 12 includes two side flanges 29a and 29b, a top flange 29c and a bottom flange 29d. Frame 12 is provided with a central opening 26, which is surrounded by an adjacent edge portion 28.

Edge portion 28 of frame 12 has a front surface 30 and rear surface 32 (FIG. 4). When frame 12 is mounted to panel 20, rear surface 32 faces toward and abuts outer surface 22 of panel 20, and front surface 30 faces outwardly away from panel 20.

As shown in the drawings, frame opening 26 is substantially rectangular in shape. A pair of posts 34, 36 are disposed at the top adjacent corners of rectangular frame opening 36, and a pair of posts 38, 40 are disposed at the bottom adjacent corners of rectangular opening 26. Posts 34–40 extend rearwardly from rear surface 32 of edge portion 28. The opening in panel 20 is also substantially rectangular in shape, corresponding roughly to the rectangle defined by flanges 29a, 29b, 29c and 29d of frame 12. Posts 34–40 are adapted to be inserted through the opening provided in panel 20, approximately adjacent each corner of the panel opening. Posts 34–40 are of sufficient length to project through panel 20, so as to extend beyond their surface 21 of panel 20. Posts 34–40 are tapered so that the cross sectional area of the post decreases as the distance from frame 12 increases, as shown in the drawings.

Top retainer plate 14 and bottom retainer plate 16 are of substantially identical construction. Top retainer plate 14 is adapted to span between posts 34 and 36, and includes a substantially flat front surface 42. A pair of passages 44, 46 extend through retainer plate 14, and are adapted to receive posts 34, 36. Passages 44 and 46 have a substantially D-shaped cross section, and have a taper along their length corresponding to the taper of posts 34 and 36. Passages 44 and 46 are adapted to slidably engage and mate with posts 34 and 36 to provide a frictional connection of top retainer plate 14 thereto. The D-shaped cross section of passages 44, 46 facilitates the frictional connection of retainer plate 14 to posts 34, 36.

As shown in FIGS. 3 and 4, front surface 42 of top retainer plate 14 is adapted to abut inner surface 21 of panel 20 when posts 34 and 36 are mated with passages 44 and 46, respectively.

Posts 34-40 may be used in forming an appropriate opening in panel 20. When the general location for the passage through panel 20 has been determined, frame 12 may be held up to apnel 20 and the locations of posts 34-40 are marked. Lines are then drawn between the marked points to form a rectangular outline, which is used to form the opening in panel 20.

To install finishing device 1 within the opening provided in panel 20, top and bottom retainer plates 14 and 16, respectively, are separated from frame 12 by forcibly removing each retainer plate at connector portion 18. Frame 12 is then mounted to panel 20 adjacent the rectangular opening formed therein, so that rear surface 32 of edge portion 28 abuts outer surface of panel 20, as shown in FIGS. 3 and 4. Flanges 29a-29d fit within the opening provided in panel 20. Top retainer plate 14 is then manually inserted through frame opening 26, and D-shaped passages 44, 46 are engaged with top posts 34 and 36. Top retainer plate 14 is then manually drawn toward panel 20 along posts 34, 36 until front surface 42 of top retainer plate 14 abuts inner surface 21 of panel 20. In this manner, edge portion 28 of frame 12 and retainer plate 14 cooperate to effectively clamp the portion of panel 20 lying therebetween, to secure frame 12 to panel 20. The same procedure is then repeated for bottom retainer plate 16.

As shown in the drawings, edge portion 28 of frame 12 is provided with a pair of top fastener openings 48, 50 and a pair of bottom fastener openings 52, 54. Similarly, top retainer plate 14 is provided with a pair of fastener openings 56, 58, and bottom retainer plate 16 is provided with a pair of fastener openings 60, 62. Threaded fasteners, such as screws 64, 66, 68 and 70 are adapted to threadedly engage fastener openings 48, 50, 52 and 54, respectively, to reinforce the mounting of frame 12 to panel 20. Fasteners 64, 66, 68 and 70 are of a length sufficient to extend through the thickness of panel 20, and to threadedly engage top and bottom retainer plates 14, 16 at fastener openings 56, 58, 60 and 62. Fasteners 64-70 may then be turned so as to draw top retainer plate 14 and bottom retainer plate 16 tightly against inner surface 21 of panel 20, and to draw rear surface 32 of frame edge 28 tightly against outer surface 22 of panel 20. In this manner, the clamping effect provided on the portion of panel 20 lying between top retainer plate 14 and the top of frame edge 28, as well as on the portion of panel 20 lying between bottom retainer plate 16 and the bottom of frame edge 28, is increased due to the inward forces provided by fasteners 64-70. This increased clamping effect provides a secure attachment of frame 12 to panel 20.

As an alternative to screws 64-70, top and bottom retainer plates 14, 16 may be secured to frame 12 by means of glue or other material which satisfactorily bonds plates 14 and 16 to posts 34, 36 and 38, 40, respectively.

A fixture, such as wall plate 72, is adapted to be mounted on the front surface of frame 12. Wall plate 72 includes a collar 74 adapted to receive an electrical lead, such as a coaxial television cable. Wall plate 72 has top and bottom fastener openings 76, 78, adapted to receive a pair of fasteners 80, 82. Frame 12 is provided with top and bottom mounting openings 84, 86, respectively. Likewise, top retainer plate 14 includes a top mounting opening 88, and bottom retainer plate 16 includes a bottom mounting opening 90. Wall palte 72 may be mounted to frame 12 by threadedly engaging fasteners 80, 82 with frame mounting openings 84 and 86, respectively. For heavier application, such as the mounting of a wall phone directly onto plate 72, fasteners 80 and 82 may be longer so as to extend through frame openings 84 and 86, respectively, to engage retainer plate mounting openings 88 and 90, respectively. In this manner, a more secure connection of wall plate 72 to frame 12 may be obtained.

The invention provides a highly satisfactory means of surrounding an electrical cable or lead at its point of exit from a wall and fixing its position relative to the wall. It should be emphasized that the invention is not limited to such an application, but also provides an effective mount for a fixture, such as a telephone, which can be supported by the apparatus of the invention on a wall at the point where the telephone cable pierces the wall.

It is recognized that various alternatives are contemplated as being within the scope of the following claims particularly pointing out and distinctly claiming the invention.

I claim:

1. A device for framing an opening in a panel, said panel having spaced first and second surfaces, comprising:

frame means for mounting adjacent said first surface of said panel and having an opening adapted to communicate with said panel opening, said frame means being provided with projection means formed integrally therewith and extending through said opening and having a portion projecting past said second panel surface; and one or more retainer means distinct from said frame means for mounting said frame means to said panel, said retainer means having engagement means adapted for slidable engagement with said portion of said projection means projecting past said second panel surface for positioning said retainer means adjacent said second panel surface upon slidable engagement of said engagement means with said projecting portion of said projection means, to mount said frame means to said panel; and securing means extending between said frame means and said retainer means for reinforcing the mounting of said frame means to said panel.

2. The invention accoring to claim 1, wherein said frame means includes an edge portion adjacent said opening in said frame means for retaining said frame means on said first surface of said panel, said edge portion having a rear surface facing toward said panel and a front surface facing outwardly from said panel when said device is secured to said panel.

3. The invention according to claim 2, further comprising mounting means disposed on said edge portion of said frame means for mounting an electrical fixture thereto.

4. The invention according to claim 3, wherein said mounting means comprises one or more openings in said edge portion of said frame means adapted to receive one or more threaded fasteners for mounting said electrical fixture to said frame.

5. The invention according to claim 4, further comprising one or more openings in said retainer means adapted to receive said one or more threaded fasteners, said fasteners adapted to extend from said electrical fixture through said frame means and into said openings in said retainer means.

6. The invention according to claim 1, wherein said projection means comprises one or more posts extending from said frame means and adapted for insertion through said opening in said panel and having a portion projecting past said second panel surface, and wherein said engagement means comprises cooperating receiving means disposed on said retainer means for receiving and engaging said projecting portion of said one or more posts for mounting said frame means to said panel.

7. The invention according to claim 6, wherein said receiving means comprises one or more passages disposed in said retainer means for mating with, and providing a frictional connection to, said one or more posts.

8. The invention according to claim 7, wherein said passages are D-shaped in cross section to facilitate provision of said frictional connection to said posts.

9. The invention according to claim 6, wherein said one or more posts are tapered so that the cross sectional area of said posts decreases as the distance from said frame increases.

10. The invention according to claim 9, wherein said receiving means disposed in said retainer means comprises one or more passages disposed in said retainer means for mating with said one or more posts, said passages having a taper corresponding to the taper of said one or more posts, to provide a frictional connection between said passages and said posts.

11. The invention according to claim 1, wherein said securing means extending between said frame means and said retainer means for reinforcing the mounting of said frame means to said panel comprises one or more threaded fasteners, each having a head engageable with said frame means and a threaded shank extending through an opening in said frame means and adapted to be received within an opening provided in said retainer means.

12. The invention according to claim 1, wherein said frame means is substantially rectangular and said panel opening is substantially rectangular, and wherein said projection means comprises a plurality of posts extending from said frame means, with one post disposed adjacent each corner of said rectangular frame opening, said posts being adapted to be inserted through said rectangular panel opening, and wherein said engagement means comprises receiving means disposed in said retainer means for receiving and engaging said posts for mounting said frame means to said panel.

13. The invention according to claim 12, wherein said retainer means comprises a pair of plates, each plate having a substantially flat surface for abutting said second surface of said panel, said plates each being adapted to span between two of said posts disposed at adjacent corners of said rectangular frame opening, and wherein said receiving means comprises a pair of passages disposed in each said plate for receiving said posts spanned by said plate.

14. A device for framing an opening in a panel, said panel having spaced first and second surfaces comprising:
frame means for mounting adjacent said first surface of said panel and having an opening adapted to communicate with said panel opening, said frame means including an edge portion adjacent said frame opening for abutting said first surface of said panel, said edge portion having a rear surface facing toward said panel and a front surface leading outwardly from said panel, said frame means being provided with projection means extending rearwardly from said rear surface of said edge portion and through said opening in said panel and having a portion projecting rearwardly of said second panel surface;
retainer means for mounting said frame means to said panel, said retainer means including engagement means for slidably engaging said portion of said projection means extending rearwardly of said second panel surface so that said retainer means abuts said second surface of said panel so that said panel is clamped between said retainer means and said edge portion of said frame means to mount said frame means to said panel; and
securing means extending between said frame means and said retainer means for reinforcing the mounting of said frame means to said panel.

15. The invention according to claim 14, wherein said projection means comprises a plurality of posts projecting from said rear surface of said edge portion and adapted to extend through said panel opening, and wherein said retainer means is provided with receiver means adapted for slidable engagement with said posts.

16. The invention according to claim 15, wherein said retainer means comprises one or more plate elements each having a flat surface for abutting said second surface of said panel, and wherein said receiver means comprises one or more passages disposed in said one or more plate elements and adapted to mate with and provide a frictional connection to said posts, to mount said frame means to said panel.

17. The invention according to claim 16, wherein said securing means comprises one or more fastener means extending between said one or more plate elements for reinforcing the mounting of said frame means to said panel by drawing said flat surfaces of said plate elements tightly against said second panel surface and drawing said rear surface of said frame edge portion tightly against said first panel surface to increase the clamping force provided on the portion of said panel between said frame means and said plate elements to secure said frame means to said panel.

18. A device for framing an opening in a panel, said panel having spaced first and second surfaces, comprising:
frame means for mounting adjacent said first surface of said panel and having an opening adapted to communicate with said panel opening, said frame means including an edge portion adjacent said frame opening for abutting said first surface of said panel, said edge portion having a rear surface facing toward said panel and a front surface facing outwardly from said panel, said frame means being provided with a plurality of posts extending rearwardly from said rear surface and adapted to extend through said opening in said panel, each post having a portion projecting rearwardly of said second panel surface;

one or more retainer plates for mounting said frame means to said panel, said retainer plates each having a flat surface for abutting said second surface of said panel, said retainer plates each being adapted to span between a pair of adjacent said posts, each retainer plate being provided with a pair of passages therethrough for mating with and providing a frictional connection to the rearwardly projecting portion of said posts between which each said retainer spans; and securing means extending between said frame means and said one or more retainer plates, said securing means adapted to engage said frame means and said one or more retainer plates for reinforcing the mounting of said frame means to said panel by drawing said flat surfaces of said retainer plates tightly against said second panel surface and drawing said rear surface of said frame edge portion tightly against said first panel surface to increase the clamping force provided on the portion of said panel between said frame means and said plate elements to secure said frame means to said panel.

* * * * *

UNITED STATES PATENT AND TRADEMARK OFFICE
CERTIFICATE OF CORRECTION

PATENT NO. : 4,790,501

DATED : December 13, 1988

INVENTOR(S) : Joseph T. Waters

It is certified that error appears in the above-identified patent and that said Letters Patent is hereby corrected as shown below:

Claim 2, col. 4, line 64, Delete "accoring" and substitute therefor ---according---

Claim 14, col. 6, line 15, Delete "leading" and substitute therefor ---facing---

Signed and Sealed this

Seventeenth Day of October, 1989

Attest:

DONALD J. QUIGG

Attesting Officer

Commissioner of Patents and Trademarks